Nov. 5, 1963     M. H. MEHR     3,109,984
SERVOMECHANISM HAND CONTROL
Filed May 28, 1958     3 Sheets-Sheet 1
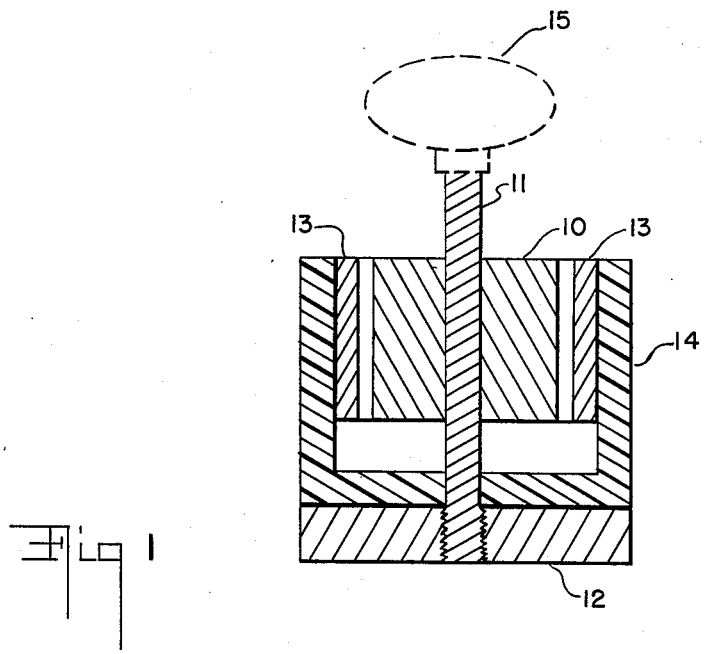
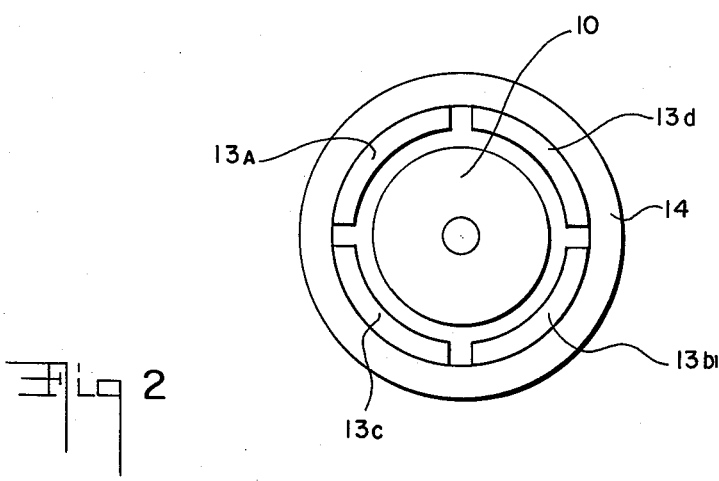
MORTON H. MEHR
INVENTOR.
BY
ATTORNEY Nov. 5, 1963   M. H. MEHR   3,109,984
SERVOMECHANISM HAND CONTROL
Filed May 28, 1958   3 Sheets-Sheet 2

MORTON H. MEHR
INVENTOR.

BY *[signature]*
ATTORNEY

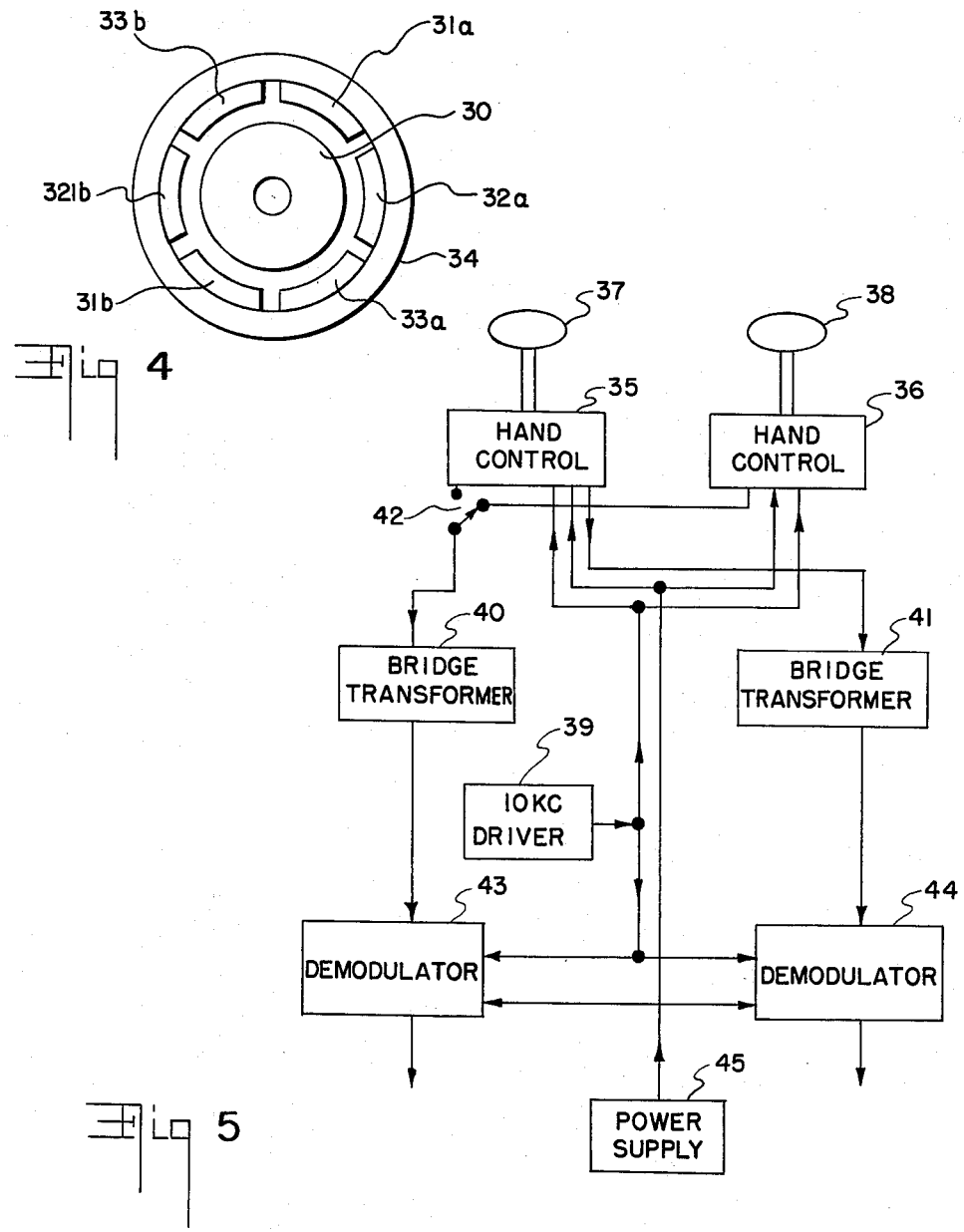

United States Patent Office 3,109,984
Patented Nov. 5, 1963

3,109,984
SERVOMECHANISM HAND CONTROL
Morton H. Mehr, Norwalk, Conn., assignor to The Perkin-Elmer Corporation, Norwalk, Conn., a corporation of New York
Filed May 28, 1958, Ser. No. 738,412
8 Claims. (Cl. 323—75)

The present invention is directed to a servomechanism hand control device especially adapted for use in connection with the type of control which is known in the servomechanism arts as a "stiff stick" hand control.

Prior art hand controls are exemplified by the displacement type which provides signals causing an object to be positioned by a servomechanism drive in accordance with the magnitude and direction of the displacement of a control member from a neutral or rest position. In use of the displacement type of hand control, the operator will frequently find that it is necessary to visually check the degree of displacement of the control member and the direction of its displacement. In many servomechanism loops, particularly those which require the operator to visually track an object, the displacement type control is not the most desirable because, from time to time, the operator must divert his attention from tracking the object in order to ascertain the displacement of the control member.

A most desirable feature of the "stiff stick" type of control is that it affords a means of causing a servomechanism loop to respond to the magnitude and direction of a pressure applied to the hand control. It has been found that operators using the "stiff stick" hand control are able to sense the degree and direction of pressure exerted on the control without visual check of the hand control. This is of particular advantage to operators of tracking instruments in that it enables the operator to devote his entire visual faculty to the tracking part of the operation.

The object of the present invention is to overcome the shortcomings of prior art hand control systems by providing a highly sensitive and accurate hand control device readily adaptable to convenient and reliable use with electronic circuitry associated with servomechanism drive systems.

The device of the present invention operates on an electrical capacitive principle and, in its preferred embodiment, comprises a central member which is stiffly but resiliently mounted and surrounded by a plurality of equally spaced segments disposed about the central member in electrical capacitive relationship. When pressure is exerted upon the central member, the slightest displacement of that member toward one or more of the segments produces a change in electrical capacitance from which is derived an electrical signal commensurate with the magnitude of the pressure and its direction. In a preferred embodiment of the present invention, the displacement of the central member with respect to the plurality of segments disposed about it in capacitive relation is so relatively small with respect to the stiffly resilient mounting of the central member that the operator is conscious only of the degree and direction of pressure exerted upon the hand control and not of its displacement. Being resiliently mounted, the hand control returns immediately to its neutral position upon pressure being removed from it. It will be appreciated by those skilled in the art that the present invention has manifold advantages in that it is extremely sensitive, reliable and lends itself readily to ruggedized construction to meet military standards, as well as facilitating operator training.

The present invention will be better understood by reference to the description of several embodiments in the accompanying drawings in which:

FIG. 1 is a cross-sectional view of a typical embodiment of the hand control device of the present invention;

FIG. 2 is a top-elevational view illustrating the disposition of the capacitive elements of the embodiment of FIG. 1;

FIG. 4 is a top-elevational view of another embodiment of the hand control invention; and FIG. 5 is a block diagram of a servomechanism drive system embodying the present invention.

Figure 3:
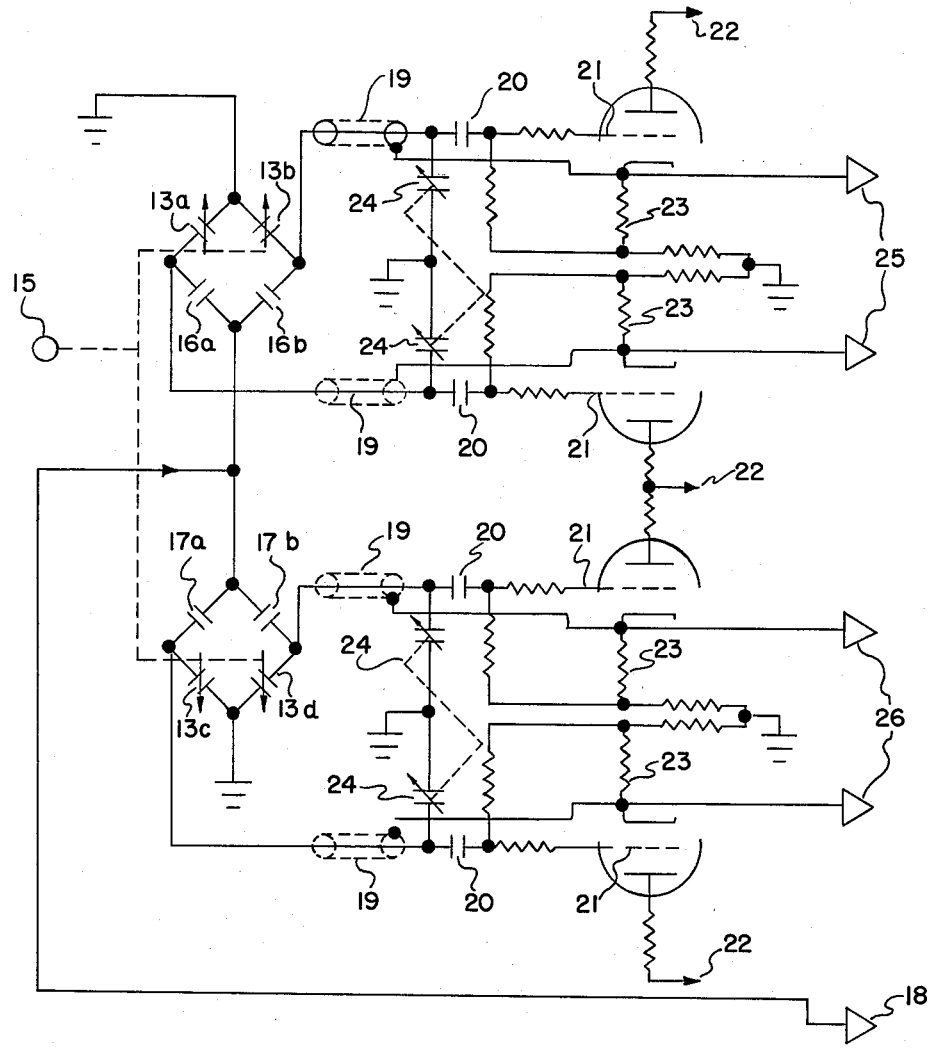
FIG. 3 is a schematic wiring diagram illustrating typical circuitry employed in one embodiment of the present invention.

As illustrated in FIG. 1, the "stiff stick" hand control of the present invention may be comprised of a central member 10 affixed to a shaft 11 resiliently mounted on a base 12 by being threaded therein. A plurality of spaced segments 13 are disposed in spaced relationship with respect to the central member 10. The segments 13 may be mounted in an insulating case 14. Appropriate electrical connections are made to the central member 10 and the spaced segment 13 and, due to the air gap therebetween, these conductive members exhibit a determinable electrical capacitance when an alternating current signal is impressed across them. The shaft 11 and central member 10 may be machined out of one piece of metal if desired, and customarily a knob 15 is mounted on the head of shaft 11 to facilitate use by the operator. The top view shown in FIG. 2 more clearly illustrates the disposition of four equally spaced segments 13a, 13b, 13c, and 13d disposed in capacitive relationship with respect to the central element 10. In a typical embodiment of the present invention, the equally spaced segments 13 may be connected to balanced bridge circuit means so as to provide alternating current electrical signals commensurate in amplitude and phase with the amount and direction of force applied with the central member 10.

Such circuitry is illustrated in FIG. 3. The knob of the hand control 15 is schematically illustrated as being mechanically linked to respective pairs of variable capacitive elements 13a—13b, and 13c—13d. Each pair of variable capacitive elements is connected in bridge circuit means which, in this particular embodiment, comprises a capacitive bridge including fixed capacitors 16a, 16b and 17a, 17b disposed in balanced arrangement. An alternating current signal is supplied to terminal 18 energizing both capacitive bridges. The alternating current potential is impressed upon the balanced bridges at points diametrically opposed to ground connections so that, as the capacitive values of the variable capacitors 13a and 13b, and 13c and 13d are changed, different magnitudes of signals are developed across the respective bridges.

The signals thus developed across the bridges are fed through appropriate shielded cable leads 19 through coupling capacitors 20 to the grids 21 of matched push-pull amplifiers. The plate circuits are connected at terminals 22 to a B+ supply while the usable output signals developed by the push-pull amplifiers are tapped from the cathode circuit resistors 23. Trimmer capacitors 24 are provided in the respective push-pull amplifier circuits for insuring balanced push-pull operation by compensation for differences in the characteristics developed by the vacuum tubes of the amplifiers and similar minor mismatching of components.

The push-pull output developed across the terminals 25 is an A.C. signal having an amplitude and phase commensurate with the changes in capacitive values appearing across the capacitive bridge which includes the variable capacitive elements 13a, 13b and the fixed capacitive elements 16a and 16b. Similarly, the push-pull output developed across terminals 26 is an A.C. signal having an amplitude and phase commensurate with the changes in capacitive values appearing across the capacitive bridge including variable capacitors 13c and 13d and fixed capacitive elements 17a and 17b. The capacitive changes developed across the two balanced bridges are in turn dependent upon any very slight movement of the central capacitive element of the hand control with respect to the plurality of segments disposed in equal spacing thereabout. Due to the stiff mounting of the central member 10, its maximum movement in any direction may be one-sixteenth of an inch or less in typical embodiments of the present invention.

The hand control device of FIGS. 1 and 2, when used in combination with the circuitry of FIG. 3 will produce push-pull A.C. output signals having respective amplitudes and phases commensurate with the magnitude and direction of pressure exerted on the central member 10 of the hand control with respect to the two axes defined by the alignment of the two pairs of spaced capacitive segments 13a—13b, and 13c—13d. It will be obvious to those skilled in the art that other kinds of appropriate balanced means may be used in conjunction with the variable capacitances developed by the hand control element. For instance, resistances and/or inductances may be used in a balanced relationship to produce a similar output signal. It will also be apparent to those familiar with the art that hard tube electronic amplifiers need not be employed but that the teaching of the present invention may be equally well carried out by transformer means or magnetic amplifier means.

The illustration of FIG. 4 shows a variant embodiment of the hand control element of the present invention. This particular embodiment, like that of FIGS. 1 and 2, includes a centrally located element 30 and diametrically opposed pairs of capacitively related segments 31a, 31b, 32a, 32b and 33a, 33b. In other respects, the hand control element of FIG. 4 is identical to that of FIGS. 1 and 2, having an insulating casing 34 disposed about the equally spaced segments 31a, 31b, 32a, 32b, 33a, 33b in support thereof. An embodiment of the hand control unit, such as that shown in FIG. 4, may be arranged to produce three different output signals in accordance with the three axes defined by the diametrically spaced pairs of segments or in an alternative arrangement may be connected so that each pair of segments is energized by one phase of a three phase signal producing an output which has a vectorial disposition in accordance with the pressure exerted on the central member 30 of the unit with respect to the paired segments equally spaced in capacitive relationship thereto.

The illustration of FIG. 5 schematically shows a servomechanism drive system which may be switched to operate in either one of two modes. One mode gives to a single operator the control over servomechanism response about two axes which, in a typical application of the present invention, may be azimuth and elevation, for instance. The other mode of operation gives control of servo-mechanism response about one axis to one operator while the response of the servomechanism drive about the other axis is controlled by another operator. The system of FIG. 5 comprises two hand controls 35 and 36, each of which may be similar to that illustrated in FIGS. 1 and 5. The central members 37 and 38 of the respective hand controls are within the control of two different operators who may be physically separated by considerable distances as required by the particular installation. An alternating current source, such as the 10 kc. driver 39 supplies an A.C. signal to both hand controls 35 and 36. Two bridge transformers 40 and 41 are provided in the system. One bridge transformer 41 is in direct connection with hand control 35. The other transformer 40 is connected to a switch means 42 which is arranged and disposed so as to render bridge transformer 40 connectable to either hand control 35 or 36. Each bridge transformer is connected to its respective demodulator 43 and 44.

Assuming for purposes of illustration that the two axes about which the servomechanism drive operates are azimuth and elevation, one of the demodulators, such as 43, will produce an elevation signal. Power is supplied to the hand controls 35 and 36 from a conventional power supply 45 and with the switch 42 in the right-hand position as shown in FIG. 5, the azimuth signal is derived from hand control 36 while the elevation signal is derived from the hand control 35.

Alternatively, with the switch 42 in the left-hand position, hand control 36 is disconnected from the output portion of the system and both the azimuth and elevation signals are provided by the same hand control 35. Thus, the system of FIG. 5 provides a first mode of operation consisting of dual operator control about two different axes and a second mode of operation providing a single operator control about the same two axes. It will be apparent to those skilled in the art that, if it is desired, the system of FIG. 5 may be slightly altered with cross-connections between hand controls 35 and 36 and both output signal channels through appropriate switching arrangements so that the control signals for either axis or both axes may be derived from either of the hand controls 35 and 36 as selected.

The structure of the capacitive device from which control signals are derived when connected in circuit with balanced bridge means in accordance with the teaching of the present invention is inherently ruggedized by reason of the stiffly resilient mounting required for its central capacitive element. The capacitive device conceived by the present invention is therefore strongly resistant to unwanted change or sources of error due to vibration, sudden accelerations, shock, or other disturbances which may be encountered in the variety of servomechanism drive systems where the present invention may be advantageously employed.

These and other features, such as simplicity of construction, ease of trimming balance, and the relatively high amplitude of control signal which may be developed by the present invention will be appreciated by those versed in the servomechanism arts.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. A servomechanism hand control circuit comprising an elongated shaft rigidly fixed in place at one end and having the other end free to be manually controlled, capacitive means having a central member mounted to said shaft and a plurality of equally spaced segments disposed about said central member in capacitive relationship thereto, bridge circuit means connected in balanced arrangement with said capacitive means, and a source of alternating current connected to energize said bridge circuit means, whereby to produce a signal having an amplitude and phase commensurate with the amount and direction of force applied to the central member of said capacitive means.

2. A servomechanism hand control circuit comprising an elongated shaft rigidly fixed in place at one end and having the other end free to be manually controlled, capacitive means having a central member mounted to said shaft and a plurality of equally spaced segments disposed in capacitive relationship thereto, a capacitive bridge connected to said capacitive means in balanced arrangement, and a source of alternating current connected to energize said capacitive bridge, whereby to produce a signal having an amplitude and phase commensurate with the amount and direction of force applied to the central member of said capacitive means.

3. A servomechanism hand control circuit comprising an elongated shaft rigidly fixed in place at one end and having the other end free to be manually controlled, capacitive means having a central member mounted to said shaft and a plurality of equally spaced segments disposed in diametrical pairs about said central member in capacitive relationship thereto, bridge circuit means connected in balanced arrangement with each pair of said capacitive segments, and a source of alternating current connected to energize said bridge circuit means, whereby to produce signals of amplitude and phase commensurate with the amount and direction of force applied to the central member of said capacitive means with respect to the diametrical axis of each pair of capacitive segments.

4. A servomechanism hand control circuit for generating signals in response to an applied force, comprising an elongated shaft rigidly fixed in place at one end and having the other end free to be manually controlled, capacitive means having a member mounted to said shaft and centrally positioned in capacitive relationship with respect to a plurality of segments, said segments being disposed in at least two diametrical pairs aligned with respective axes intersecting at the axis of said central member, bridge circuit means connected in balanced arrangement with each pair of said capacitive segments, a source of alternating current connected to energize said bridge circuit means, and output means connected across the potential developed by each said bridge circuit whereby to produce signals commensurate in amplitude and phase to the amount and direction of force applied to the central member of said capacitive means with respect to the diametrical axis of each pair of capacitive segments.

5. A servomechanism hand control circuit for generating signals in response to a force applied relative to first and second perpendicular axes, comprising capacitive means having a resiliently mounted member centrally positioned in capacitive relationship with respect to a plurality of segments, said segments being disposed in diametrical pairs aligned with said first and second perpendicular axes, bridge circuit means connected in balanced arrangement with each pair of said capacitive segments, a source of alternating current connected to energize said bridge circuit means, and output means connected across the potential developed by each said bridge circuit whereby to produce first and second signals of amplitude and phase dependent upon the amount and direction of force applied to the central member relative to said first and second perpendicular axes, respectively.

6. A servomechanism hand control circuit adapted for dual operator control from different points and about two different axes comprising first and second capacitive means, each having a resiliently mounted member centrally positioned in capacitive relationship with respect to a pair of segments aligned with one of said two axes, bridge circuit means connected in balanced arrangement with each pair of said capacitive segments, a source of alternating current connected to energize said bridge circuit means, and output means connected across the potential developed by each said bridge circuit means, whereby to produce separate signals commensurate in amplitude and phase to the amount and direction of force applied to the central member of the respective capacitive means relative to the axis of its capacitive segments.

7. A servomechanism hand control circuit adapted for single operator control about two axes or dual operator control from different points and about two different axes, comprising first and second capacitive means, each having a resiliently mounted member centrally positioned in capacitive relationship with respect to two diametrical pairs of segments aligned with first and second perpendicular axes, bridge circuit means connected in balanced arrangement with each pair of said capacitive segments, a source of alternating current connected to energize said bridge circuit means, dual output means connected across the potential developed by each said bridge circuit means, and switch means connected between said bridge circuit means and said output means, said switch having a first position for connecting both pairs of segments of said first capacitive means to said output means and having a second position for connecting one pair of capacitive segments from each of said first and second capacitive means to respective output means.

8. A servomechanism hand control circuit comprising a base means; elongated actuating means having one end rigidly affixed to said base means and the other end being free to be manually moved and characterized by the ability to bend under the application of external physical force but substantially unyielding to the forces of gravity, said actuating means including first electrically conductive means; second electrically conductive means in spaced electrically capacitive relationship with said first electrically conductive means; bridge circuit means connected in balanced capacitive arrangement with said first and second conductive means; and a source of alternating current connected to energize said bridge circuit means, whereby a signal is produced having an amplitude and phase commensurate with the amount and direction of force applied to the actuating means.

References Cited in the file of this patent

UNITED STATES PATENTS

| | | |
|---|---|---|
| 2,377,869 | Elliott | June 12, 1945 |
| 2,589,535 | Calvert | Mar. 18, 1952 |
| 2,598,672 | Braddon et al. | June 3, 1952 |
| 2,633,028 | Fillerbrown | Mar. 31, 1953 |
| 2,751,530 | Armstrong | June 19, 1956 |
| 2,867,757 | Wagner | Jan. 6, 1959 |
| 2,870,399 | Davidson et al. | Jan. 20, 1959 |
| 2,892,152 | Buisson | June 23, 1959 |